(12) United States Patent
Song et al.

(10) Patent No.: US 8,192,082 B2
(45) Date of Patent: Jun. 5, 2012

(54) THERMAL DATA OUTPUT CIRCUIT AND MULTI CHIP PACKAGE USING THE SAME

(75) Inventors: Ho Uk Song, Icheon-si (KR); Shin Ho Chu, Icheon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 744 days.

(21) Appl. No.: 12/317,218

(22) Filed: Dec. 18, 2008

(65) Prior Publication Data

US 2009/0168840 A1 Jul. 2, 2009

(30) Foreign Application Priority Data

Jan. 2, 2008 (KR) .................. 10-2008-0000368

(51) Int. Cl.
*G01K 7/00* (2006.01)
(52) U.S. Cl. ........................ 374/170; 374/178
(58) Field of Classification Search ............ 374/170, 374/171, 178
See application file for complete search history.

(56) References Cited

U.S. PATENT DOCUMENTS

| | | | | |
|---|---|---|---|---|
| 5,255,149 A * | 10/1993 | Matsuo | .......................... | 374/166 |
| 5,444,637 A * | 8/1995 | Smesny et al. | ................ | 702/127 |
| 6,349,269 B1 | 2/2002 | Wallace, Jr. | | |
| 7,198,403 B2 * | 4/2007 | Proll et al. | .................... | 374/178 |
| 2005/0226309 A1 * | 10/2005 | Proll et al. | .................... | 374/163 |
| 2007/0004055 A1 * | 1/2007 | Ball et al. | ........................ | 438/14 |
| 2007/0191993 A1 * | 8/2007 | Wyatt | ............................. | 700/299 |
| 2007/0262804 A1 * | 11/2007 | Song | ............................. | 327/291 |
| 2008/0036525 A1 * | 2/2008 | Kim | ............................... | 327/512 |
| 2008/0177482 A1 * | 7/2008 | Kishida et al. | .................. | 702/35 |
| 2009/0059691 A1 * | 3/2009 | Chu et al. | ...................... | 365/191 |
| 2009/0168840 A1 * | 7/2009 | Song et al. | ..................... | 374/170 |
| 2009/0207673 A1 * | 8/2009 | Chu et al. | ................. | 365/189.08 |
| 2009/0230986 A1 * | 9/2009 | An et al. | ........................ | 324/763 |
| 2009/0262781 A1 * | 10/2009 | Shumaker et al. | ............ | 374/141 |
| 2011/0150029 A1 * | 6/2011 | Pan | ................................... | 374/1 |
| 2011/0292746 A1 * | 12/2011 | Chu | .......................... | 365/189.17 |

FOREIGN PATENT DOCUMENTS

| | | |
|---|---|---|
| KR | 10-2006-0004784 A | 1/2006 |
| KR | 10-2007-0025000 | 3/2007 |

* cited by examiner

*Primary Examiner* — Yaritza Guadalupe-McCall

(74) *Attorney, Agent, or Firm* — John P. White; Cooper & Dunham LLP

(57) ABSTRACT

A temperature data output circuit is provided which is capable of outputting a temperature signal which is enabled when an internal temperature of at least one of the semiconductor memory chips mounted on a multi chip package exceeds a predetermined temperature.

11 Claims, 4 Drawing Sheets

THERMAL DATA OUTPUT CIRCUIT AND MULTI CHIP PACKAGE USING THE SAME

TECHNICAL FIELD

The present disclosure relates to a multi chip package chip, and more particularly to a temperature data output circuit capable of extracting temperature data in a multi chip package MCP structure on which two or more semiconductor memory chips are mounted.

BACKGROUND

Generally, a semiconductor memory device has a temperature sensor to control the operational condition of internal circuits according to internal temperature. A conventional temperature sensor generates digital code temperature data including internal temperature data, reads the temperature data to combine codes and generates a temperature signal. The temperature signal generated from the temperature sensor is utilized to control the operational condition of internal circuits in the semiconductor memory device. The temperature signals generated from the temperature sensor include a temperature signal corresponding to an internal temperature of a semiconductor memory chip generated to change a self refresh cycle and a temperature signal which is enabled when an internal temperature of the semiconductor memory chip is high.

FIG. 1 is a diagram illustrating a configuration of a conventional temperature data output circuit.

As shown in FIG. 1, the conventional temperature data output circuit includes a temperature sensor 1 which generates a temperature signal TQ enabled when an internal temperature of a semiconductor memory chip, specifically, a junction temperature of a semiconductor memory chip exceeds a predetermined level, and an output driver 2 which drives the temperature signal TQ and outputs it to a TQ pad 3.

The temperature data output circuit as configured above outputs the temperature signal TQ of high level to the TQ pad 3 when the internal temperature of the semiconductor memory chip exceeds a predetermined level.

In the case that a multi chip package MCP is configured by mounting more than two semiconductor memory chips on the MCP, the internal temperatures of the mounted semiconductor memory chips are variable according to the mounting position or design method. However, since the mounted semiconductor memory chips output internal temperature data of corresponding semiconductor memory chip through respective TQ pads, it is impossible to extract and output only the temperature signal output from the semiconductor memory chip having the highest internal temperature among mounted semiconductor memory chips.

BRIEF SUMMARY

In an aspect of the present disclosure, a temperature data output circuit is provided which is capable of outputting a temperature signal which is enabled when an internal temperature of at least one of the semiconductor memory chips mounted on a multi chip package MCP exceeds a predetermined temperature.

In an exemplary embodiment, a temperature data output circuit includes a control unit which inputs a first temperature signal including internal temperature data of a first semiconductor memory chip and a second temperature signal including internal temperature data of a second semiconductor memory chip and generates an output temperature signal enabled when at least one of the first and second temperature signals is enabled.

In another exemplary embodiment, a temperature data output circuit includes a first temperature data output circuit which outputs a first temperature signal including internal temperature data of a first semiconductor memory chip, an input pad which inputs the first temperature signal, a temperature sensor which generates a second temperature signal including internal temperature data of a second semiconductor memory chip, a control unit which generates an output temperature signal enabled when at least one of the first and second temperature signals is enabled, and an output driver which drives the output temperature signal and outputs it through an output pad.

In still another exemplary embodiment, a temperature data output circuit includes an input pad which inputs and transmits a first temperature signal including internal temperature data of a first semiconductor memory chip, a temperature sensor which senses an internal temperature of a second semiconductor memory chip and generates a second temperature signal, and a control unit which inputs the first and second temperature signals and generates an output temperature signal.

BRIEF DESCRIPTION OF THE DRAWINGS

The above and other aspects, features and other advantages of the subject matter of the present disclosure will be more clearly understood from the following detailed description taken in conjunction with the accompanying drawings, in which.

DETAILED DESCRIPTION OF PREFERRED EMBODIMENTS

Hereinafter, examples and exemplary embodiments of the present disclosure will be described with reference to accompanying drawings. However, the examples and embodiments are for illustrative purposes only and are not intended to limit the scope of the invention.

Figure 1:
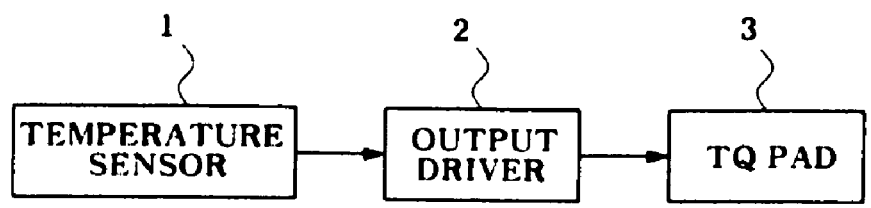
FIG. 1 is a diagram showing a configuration of a conventional temperature data output circuit.
Figure 2:
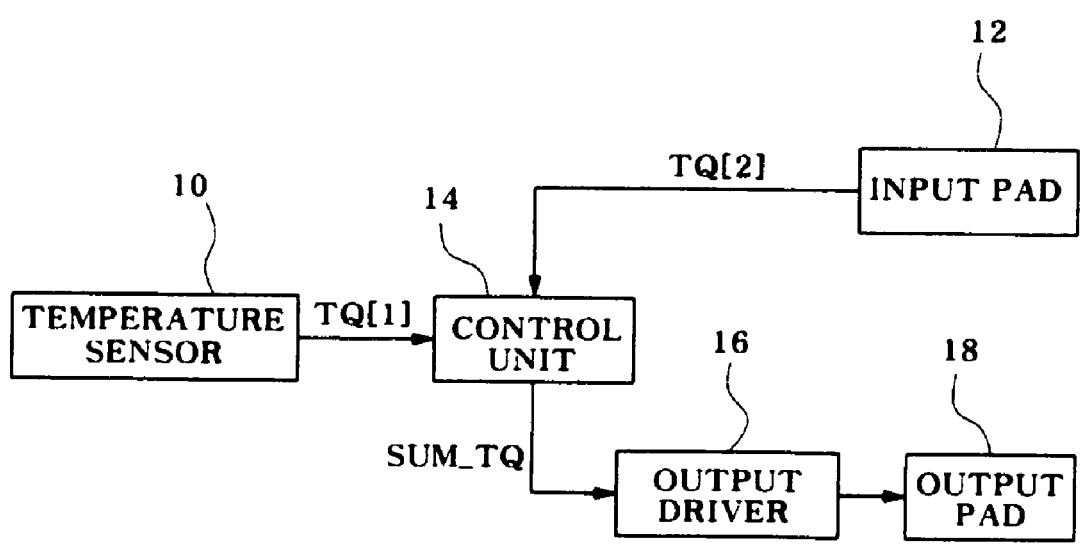
FIG. 2 is a block diagram showing an example of configuration of a temperature data output circuit according to an exemplary embodiment of the present disclosure.
Figure 3:
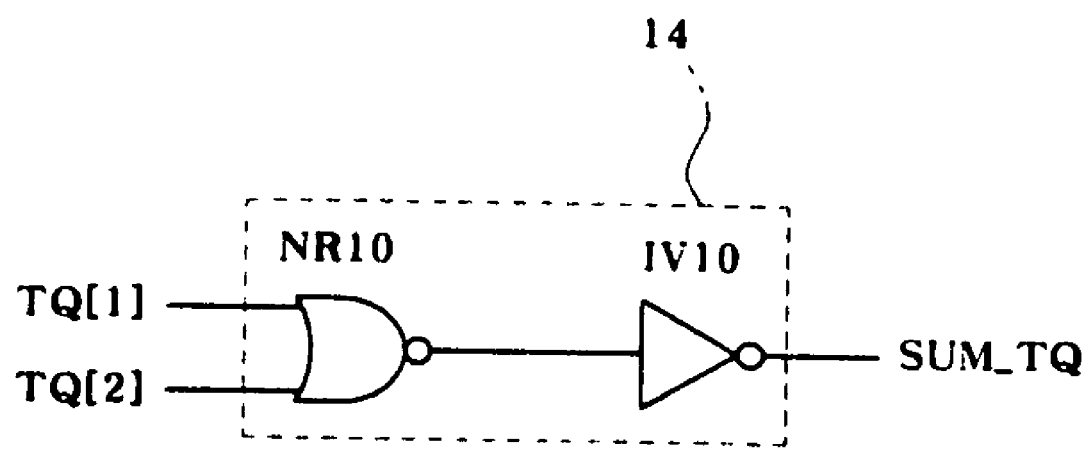
FIG. 3 is a circuit diagram showing an example of configuration of a control unit in the temperature data output circuit shown in FIG. 2.

FIG. 2 is a block diagram showing an example of configuration of a temperature data output circuit according to an exemplary embodiment of the present disclosure, and FIG. 3 is a circuit diagram showing an example of configuration of a control unit in the temperature data output circuit shown in FIG. 2.

The temperature data output circuit shown in FIG. 2 includes a temperature sensor 10 which senses temperature of a first semiconductor memory chip and generates a first temperature signal TQ[1] including internal temperature data of a first semiconductor memory chip, an input pad 12 which inputs a second temperature signal TQ[2] including internal temperature data of a second semiconductor memory chip, a control unit 14 which inputs the first and second temperature signals TQ[1] and TQ[2] and generates an output temperature signal SUM_TQ, and an output driver 16 which drives the output temperature signal SUM_TQ and outputs it to an output pad 18.

Here, the first temperature signal TQ[1] is a signal which is enabled to a high level when an internal temperature of the first semiconductor memory chip exceeds a predetermined level, and the second temperature signal TQ[2] is a signal which is enabled to a high level when an Internal temperature of the second semiconductor memory chip exceeds a predetermined level. The output temperature signal SUM_TQ is a signal which is enabled when at least one of the first and second temperature signals TQ[1] and TQ[2] is enabled. The input pad 12 is configured to output a signal which is disabled to a low level when there is no input signal.

As shown in FIG. 3, the control unit 14 includes a NOR gate NR10 which inputs the first and second temperature signals TQ[1] and TQ[2] and performs an OR operation, and an inverter IN10.

Figure 4:
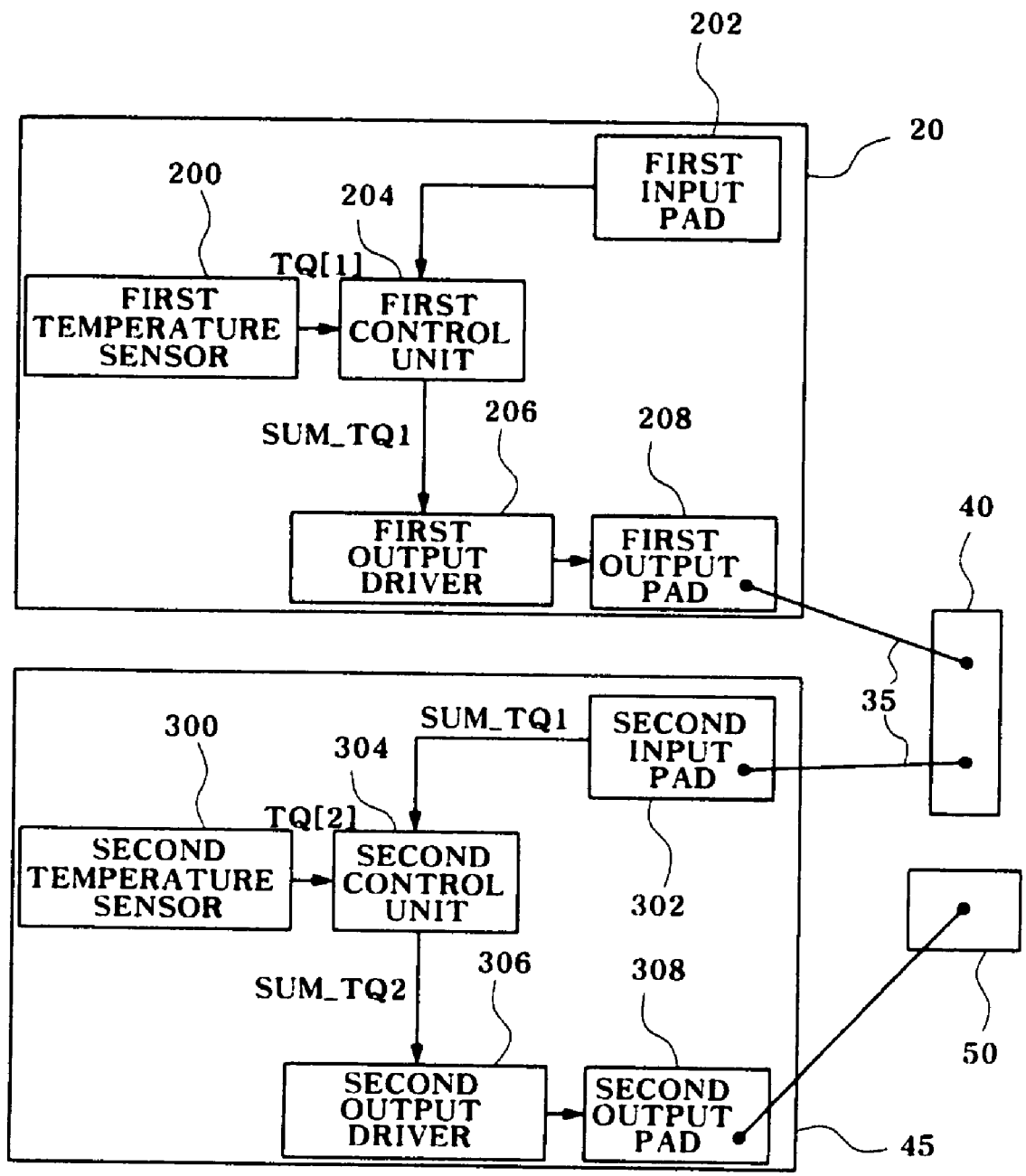
FIG. 4 is a block diagram showing an example of configuration of a double chip package DCP on which semiconductor memory chips including a temperature data output circuit are mounted according to an exemplary embodiment of the present disclosure.

A double chip package DCP as shown in FIG. 4 can be embodied by using two semiconductor memory chips on which the temperature data output circuit as configured above is mounted.

The double chip package of the present disclosure includes a first semiconductor memory chip 20 having a first temperature sensor 200, a first input pad 202, a first control unit 204, a first output driver 206 and a first output pad 208, a second semiconductor memory chip 30 having a second temperature sensor 300, a second input pad 302, a second control unit 304, a second output driver 306, and a second output pad 308, a first bonding pad 40 which is connected to the first output pad 208 and the second input pad 302 by a first wire bonding 35, and a second bonding pad 50 which is connected to the second output pad 308 by a second wire bonding 45.

Figure 5:
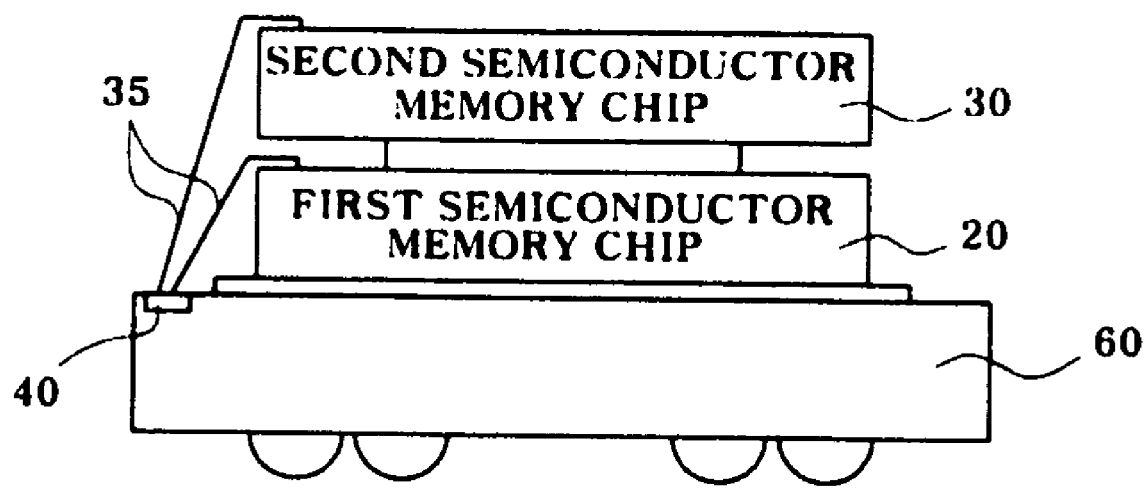
FIG. 5 is a diagram showing an embodiment of a multi chip package MCP shown in FIG. 4.

Referring to FIG. 5, the first semiconductor memory chip 20 and the second semiconductor memory chip 30 are layered on a semiconductor substrate 60, and the layered first and second semiconductor memory chips 20 and 30 are connected to the first bonding pad 40 formed on the semiconductor substrate 60 through the first wire bonding 35.

Hereinafter, a process of outputting the output temperature signal SUM_TQ in the double chip package as described above will be discussed.

First, the first temperature sensor 200 generates the first temperature signal TQ[1] which is enabled to a high level when the internal temperature of the first semiconductor memory chip 20 exceeds a predetermined level. The first control unit 204 inputs an output signal of the first input pad 202 and the first temperature signal TQ[1] and generates a first output temperature signal SUM_TQ1. At this time, since there is no signal input through the first input pad 202, the first input pad 202 outputs an output signal of low level. Accordingly, the first output temperature signal SUM_TQ1 is formed to have a level substantially identical to that of the first temperature signal TQ[1].

The first output temperature signal SUM_TQ1 is driven through the first output driver 206 and is output to the first output pad 208. The first output temperature signal SUM_TQ1 output from the first output pad 208 is input to the second input pad 302 through the first wire bonding 35 and the first bonding pad 40, and the second input pad 302 transmits the first output temperature signal SUM_TQ1 to the second control unit 304.

At this time, the second temperature sensor 300 generates the second temperature signal TQ[2] which is enabled to a high level when the internal temperature of the second semiconductor memory chip 30 exceeds a predetermined level and transmits it to the second control unit 304.

The second control unit 304 inputs the first output temperature signal SUM_TQ1 and the second temperature signal TQ[2] to perform an OR operation, and generates a second output temperature signal SUM_TQ2 which is enabled to a high level when at least one of the first output temperature signal SUM_TQ1 and the second temperature signal TQ[2] is enabled to a high level. The second output temperature signal SUM_TQ2 is driven through the second output driver 306 and is output to the second output pad 308. An output signal of the second output pad 308 is transmitted to the second bonding pad 50 through the second wire bonding 45.

In the case that the temperature data output circuit of the present disclosure is embodied on the double chip package, the second output temperature signal SUM_TQ2 output through the second output pad 308 is enabled to a high level when at least one of the first output temperature signal SUM_TQ1 and the second temperature signal TQ[2] is enabled to a high level. Here, since the first output temperature signal SUM_TQ1 is formed to have an identical level to the first temperature signal TQ[1], the second output temperature signal SUM_TQ2 is enabled to a high level when at least one of the first and second temperature signals TQ[1] and TQ[2] is enabled to a high level. In other words, the second output temperature signal SUM_TQ2 output through the second output pad 308 is enabled to a high level when the internal temperature of at least one of the first and second semiconductor memory chips 20 and 30 exceeds a predetermined level. Referring to Table 1, the level of the second output temperature signal SUM_TQ2 is determined according to the levels of the first and second temperature signals TQ[1] and TQ[2].

TABLE 1

| TQ[1] | TQ[2] | TQ_SUM |
|---|---|---|
| L | L | L |
| L | H | H |
| H | L | H |
| H | H | H |

Even though a multi chip package MCP on which a plurality of semiconductor memory chips having the temperature data output circuit of the present disclosure is embodied, it is possible to extract and output only the temperature signal output from the semiconductor memory chip having the highest internal temperature among the semiconductor memory chips mounted on the multi chip package MCP, by generating the second output temperature signal SUM-TQ2 which is enabled to a high level when the internal temperature of at least one of the semiconductor memory chips mounted on the multi chip package exceeds a predetermined level.

Although examples and exemplary embodiments of the present invention have been described for illustrative purposes, those skilled in the art will appreciate that various modifications, additions and substitutions are possible, without departing from the scope and spirit of the Invention and the accompanying claims.

The present disclosure claims priority to Korean application number 10-20080000368, filed on Jan. 2, 2008, the entire contents of which are incorporated herein by reference.

What is claimed is:

1. A temperature data output circuit, comprising:
an input pad which inputs and transmits a first temperature signal including data corresponding to an internal temperature of a first semiconductor memory chip;
a temperature sensor which senses an internal temperature of a second semiconductor memory chip and generates a second temperature signal; and
a control unit which inputs the first temperature signal and the second temperature signal and generates an output temperature signal,
wherein the input pad, the temperature sensor and the control unit are formed in the second semiconductor chip.

2. The temperature data output circuit of claim 1, wherein the first temperature signal is enabled when the internal temperature of the first semiconductor memory chip exceeds a predetermined level.

3. The temperature data output circuit of claim 1, wherein the second temperature signal is enabled when the internal temperature of the second semiconductor memory chip exceeds a predetermined level.

4. The temperature data output circuit of claim 1, wherein the control unit generates the output temperature signal which is enabled when at least one of the first and second temperature signals is enabled.

5. The temperature data output circuit of claim 1, wherein the input pad outputs a disabled signal when the first temperature signal is not input.

6. The temperature data output circuit of claim 1, further comprising an output driver which drives the output temperature signal and outputs the output temperature signal through an output pad.

7. A multi chip package comprising:
a first semiconductor memory chip which generates and outputs a first temperature signal; and
a second semiconductor memory chip comprises
an input pad which inputs the first temperature signal,
a first temperature sensor which generates a second temperature signal,
a first control unit which generates a first output temperature signal enabled when at least one of the first and second temperature signals is enabled, and
a first output driver which drives the first output temperature signal and outputs the first output temperature signal through an first output pad.

8. The temperature data output circuit of claim 7, wherein the first temperature signal is enabled when the internal temperature of the first semiconductor memory chip exceeds a predetermined level.

9. The temperature data output circuit of claim 7, wherein the second temperature signal is enabled when the internal temperature of the second semiconductor memory chip exceeds a predetermined level.

10. The temperature data output circuit of claim 7, wherein the first control unit includes a logic unit which inputs the first and second temperature signals and performs an OR operation.

11. The temperature data output circuit of claim 7, wherein the first semiconductor memory chip includes:
a second temperature sensor which senses the internal temperature of the first semiconductor memory chip and generates the first temperature signal;
a second control unit which inputs and outputs the first temperature signal; and
a second output driver which drives the first temperature signal and outputs the first temperature signal through an second output pad.

* * * * *